United States Patent [19]

Strickland

[11] 4,422,446

[45] * Dec. 27, 1983

[54] SOLAR FURNACE APPARATUS

[76] Inventor: Benjamin W. Strickland, P.O. Box 30, Joliet, Mont. 59041

[*] Notice: The portion of the term of this patent subsequent to Sep. 29, 1998, has been disclaimed.

[21] Appl. No.: 306,168

[22] Filed: Sep. 28, 1981

Related U.S. Application Data

[63] Continuation-in-part of Ser. No. 64,493, Aug. 7, 1979, Pat. No. 4,291,678.

[51] Int. Cl.³ .............................................. F24J 3/02
[52] U.S. Cl. .................................... 126/438; 126/436; 126/439; 126/446; 126/451; 126/449
[58] Field of Search ............... 126/438, 439, 449, 451, 126/436, 417, 425, 430, 446; 350/288, 289, 292, 293, 299; 165/179; 138/38

[56] References Cited

U.S. PATENT DOCUMENTS

| | | | |
|---|---|---|---|
| 2,760,482 | 8/1956 | Tarcici | 126/451 |
| 3,064,534 | 11/1962 | Tumavicus | 126/451 X |
| 3,105,486 | 10/1963 | Glenn | 126/451 X |
| 3,247,840 | 4/1966 | Chambers et al. | 126/438 X |
| 4,077,391 | 3/1978 | Way, Jr. | 126/438 X |
| 4,291,678 | 9/1981 | Strickland | 126/438 |

*Primary Examiner*—Larry Jones
*Attorney, Agent, or Firm*—Arthur L. Urban

[57] ABSTRACT

A solar furnace apparatus including a reflector portion, a collector portion and a fluid transfer portion; the reflector portion including a generally dish-shaped reflective member, the reflective member having a conic section configuration with a large open face and a highly reflective internal surface, the reflective member including a fixed base section concentric with the axis of the reflective member, a plurality of movable curved segments extending from the fixed base section to the free edge of the open face of the reflective member, the end of each segment adjacent to the fixed base section being pivotally connected thereto; the collector portion being disposed along the axis and the focal point of the reflective member, the collector portion including a chamber formed of a plurality of concave longitudinal conductive metal sections joined at their edges, the cross section of the longitudinal sections forming a generally star-shaped configuration, the concave longitudinal sections being disposed substantially parallel to the longitudinal axis of the reflective member, end sections affixed to the free edges of the concave longitudinal sections and therewith forming an enclosed chamber, a central conduit extending from one of the end sections to a point adjacent the other end section but spaced therefrom, a plurality of discrete longitudinal baffles disposed within the chamber around the central conduit, an inlet and an outlet communicating with the chamber.

9 Claims, 5 Drawing Figures

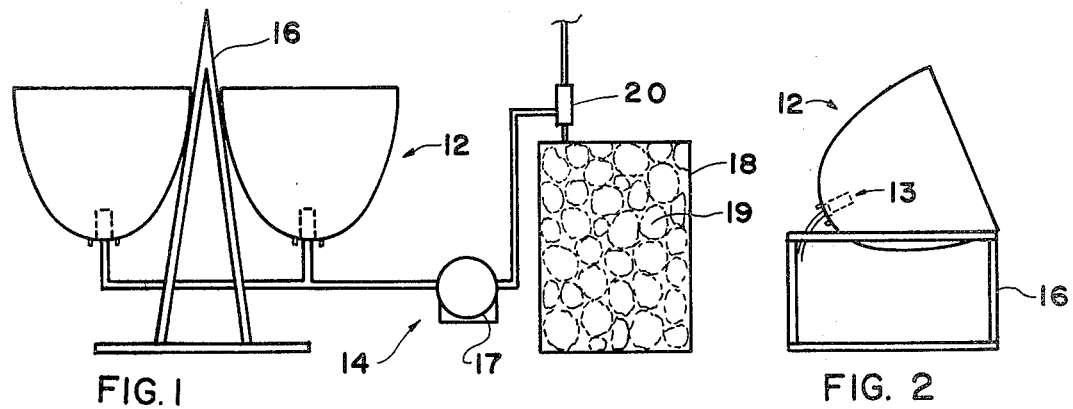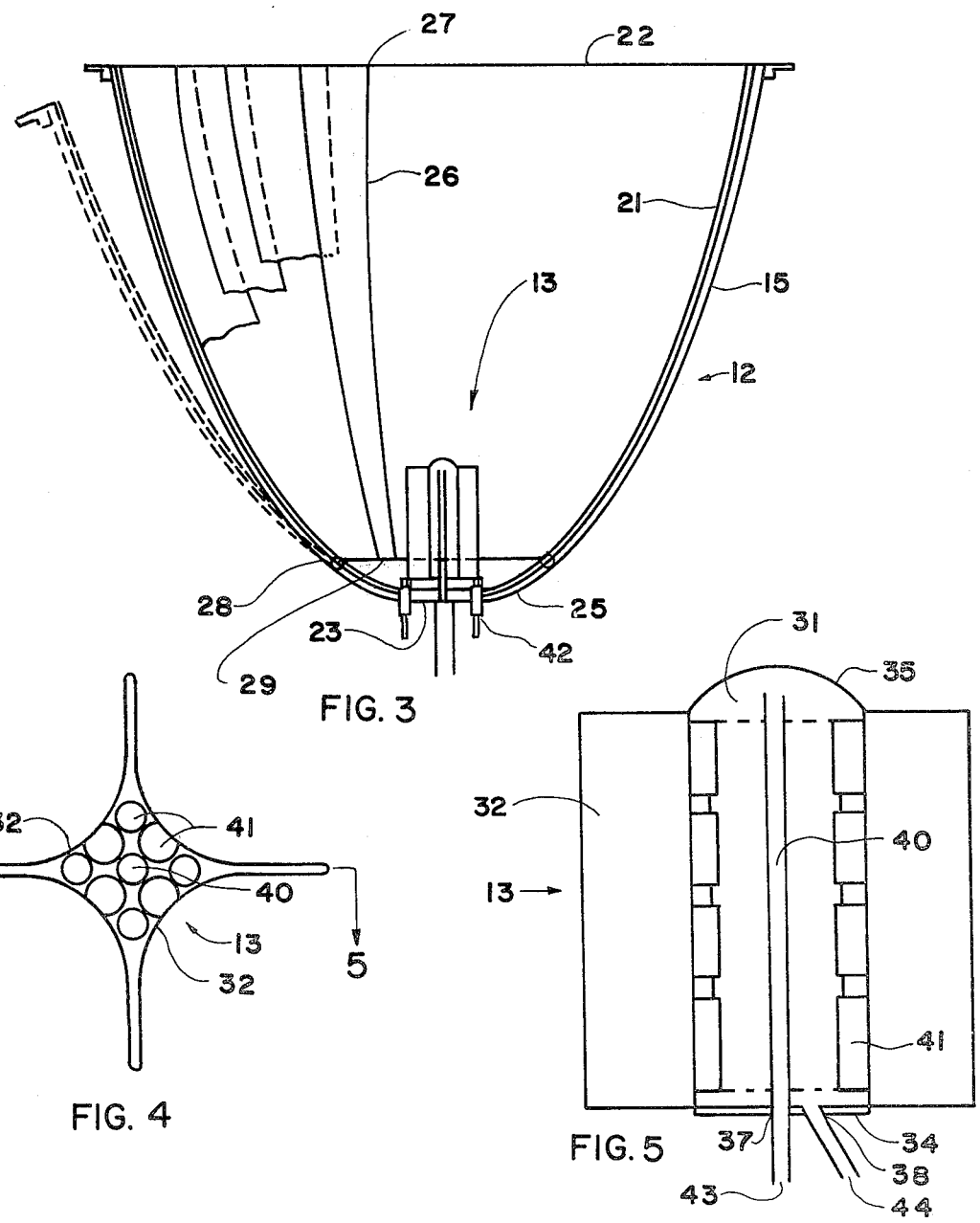

SOLAR FURNACE APPARATUS

This application is a continuation-in-part of pending application, Ser. No. 64,493, filed Aug. 7, 1979, now U.S. Pat. No. 4,291,678.

This invention relates to a novel heating apparatus and more particularly relates to a new solar furnace apparatus.

With recent large increases in the cost of conventional energy sources such as electricity, petroleum and coal, both in the United States and foreign countries, a great deal of attention is being given to alternative energy sources. One energy source which is especially appealing is solar energy because of its unlimited supply and the absence of pollution and other ecological problems therewith.

A number of different solar energy systems have been proposed heretofore. Generally, these systems have involved the absorption of the heat from the sun by gases or liquids and the circulation thereof to areas requiring heat. If all the heat collected by the system is not needed when the sun is shining, the heated gases or liquids can be circulated to storage chambers where the heated fluid is stored. Also, the fluid is circulated through a heat absorbing material, such as a bed of rocks which will absorb and store the heat energy for future recovery.

Since solar energy itself is free, the principal costs of solar energy systems are the initial expenditure for the solar energy converting equipment and the subsequent expense of operating and maintaining the equipment. Ideally, it is desirable to increase the temperature of the gas or liquid as much as possible during each passage of the fluid through the equipment so that a minimum size of equipment will be required to accomplish the desired absorption of heat. Thus, improving the operating efficiency of solar energy conversion systems can result in a significant savings both in capital investment and in operating costs.

Much effort has been expended on ways to improve the efficiency of solar energy systems. One area of needed improvement is the design of the actual physical structures utilized. Generally, it has been found that the more complex the system, the greater the energy recovery. However, since the costs ordinarily increase with the complexity of the system, the cost per unit of energy recovered still is relatively high. Because the costs of solar energy systems to date have been quite large, the costs exceed the available resources of the ordinary individual. Thus, the government has offered tax credits and other incentives to increase the acceptance and use of solar energy systems. However, there has been criticism of such incentives since they in effect provide an advantage for one part of the population at the expense of other taxpayers.

The present invention provides a novel solar furnace apparatus with advantages and features not present on systems presently available. The solar furnace apparatus of the invention is simple in design and relatively inexpensive to manufacture. The solar furnace apparatus provides a high degree of efficiency of operation. Thus, the apparatus can be of a minimum size for a given heating requirement. Likewise, the equipment costs for a given installation can be minimized.

Another advantage of the solar furnace apparatus of the present invention is that the apparatus can be fabricated from commercially available components and materials using conventional metal working techniques. Also, the apparatus can be fabricated in small self-contained units which can be installed singly or in groups so that energy can be generated in small quantities or larger amounts as desired.

Other benefits and advantages of the novel solar furnace apparatus of the present invention will be apparent from the following description and the accompanying drawings in which:

FIG. 1 is a schematic illustration of one form of the solar furnace apparatus in a heating system;

FIG. 2 is a side view of the solar furnace apparatus shown in FIG. 1 in a partially elevated position;

FIG. 3 is an enlarged fragmentary side view in section of the solar furnace apparatus shown in FIGS. 1 and 2;

FIG. 4 is a further enlarged cross-sectional view of the collector portion of the solar furnace apparatus shown in FIGS. 1-3; and FIG. 5 is a sectional view of the collector portion shown in FIG. 4 taken along line 5—5 thereof.

As shown in the drawings, one form of the novel solar heating apparatus of the invention includes a reflector portion 12, a collector portion 13 and a fluid transfer portion 14. The apparatus is mounted on a frame 16 which as shown in FIG. 1 supports a pair of furnaces. The apparatus of the invention forms part of a solar heating system which may include circulating means such as pump 17 and a heat storage chamber 18 which may include a heat absorbing material such as rocks 19. The solar heating system also may include heat dissipating devices such as a radiator 20 in the room of a dwelling.

Reflector portion 12 includes a reflective member 15 with an internal surface 21 of highly reflective material. The generally dish-shaped reflective member 15 has a conic section configuration, that is, semi-elliptical or parabolic-like, as shown in the drawings, particularly FIG. 3. The reflective member 15 has a large open face 22 and may have a small opening 23 at the apex of the closed portion thereof.

The reflective member 15 includes a fixed based section 25. The base section 25 is disposed concentrically of the axis of the reflective member 15. A plurality of movable segments 26 extend from the base section 25 to the free edge 27 of the open face 22 of the reflective member 15. The end 28 of each segment 26 that is adjacent to the base section 25 is pivotally connected to the base section.

Advantageously, the pivotal connection 29 of the movable segments 26 with the base section 25 is located significantly closer to the axis of the reflective member 15 than to the open face 22 thereof. The pivotal connection 29 preferably is spaced from the axis of the reflective member 15 a distance less than about one-fourth the distance between the axis and the open face 22 thereof.

It is desirable that adjoining movable segments 26 overlap one another along at least a portion of their lengths. Advantageously, the adjoining segments overlap along substantially their entire lengths.

Means may be provided for coordinating the movement of the segments 26 with respect to each other. As shown in the drawings, the segments 28 may be interleaved around the surface of the reflective member 15 to achieve the desired coordination.

The collector portion 13 is disposed at the focal point of the reflective member 15. The collector portion 13 is disposed along the axis of the reflective member 15.

The collector portion 13 includes a chamber 31 formed of a plurality of concave longitudinal sections 32 which are joined at their longitudinal edges. The concave longitudinal sections 32 of the collector portion 13 are disposed substantially parallel to the longitudinal axis of the reflective member. As shown in FIG. 4, this arrangement of the longitudinal sections 32 forms a generally star-shaped configuration. Preferably, the distance across the collector portion 13, that is, the distance between the opposing points of the star-shaped configuration is between about one and one-half and three times the smallest cross-sectional dimension of the collector portion.

The chamber 31 of the collector portion is enclosed by end sections 34 and 35. Also, the chamber 31 includes inlet and outlet means 37 and 38 respectively. The collector portion 13 as shown in FIGS. 4 and 5 further includes central conduit means 40. The conduit 40 extends from end section 34 to a point adjacent the other end section 35 but spaced therefrom.

The collector portion 13 also includes a plurality of discrete longitudinal baffle means 41. The baffles 41 are disposed within the chamber 31 around the central conduit 40. The baffles 41 advantageously are tubular sections and preferably the baffles are divided longitudinally as shown into a number of separate sections.

The sections of the collector portion 13 are formed of a conductive metal. Advantageously, highly conductive metals such as copper, aluminum and the like are utilized in the collector portion to provide a high degree of heat transfer and to improve the operating efficiency of the apparatus.

As pointed out above, the collector portion 13 is located at the focal point of the reflector portion 12. The collector portion 13 includes mounting means shown as brackets 42 for securing the collector portion adjacent the opening 23 at the apex of the reflective member 15. The collector portion 13 may be spaced from the apex opening 23 a distance less than the length of the concave longitudinal sections 32 of the collector portion.

The fluid transfer portion 14 includes conduit means. As shown a conduit 43 is connected to the inlet 37 of the collector portion 13 and a second conduit 44 is connected to the outlet 38 of the collector portion. Means such as pump 17 are associated with the apparatus for circulating fluid to a heat storage chamber 18 or a heat dissipating device such as radiator 20 as described above.

In the operation of the solar furnace apparatus of the invention as shown in the drawings, the reflective member 15 is mounted on a frame 16 and the fluid transfer portion 14 connected into a closed system which may include a pump 17, a heat storage chamber 18 and a number of heat dissipating devices such as radiator 20. The collector portion 13 is aligned at the focal point of the reflector portion 12.

The furnace is oriented advantageously toward the sun with the opening 22 in alignment therewith. The sun's rays striking the highly reflective inner surface of the reflective member 15 are reflected toward the collector portion 13 which is positioned at the focal point of the reflective member.

To properly focus the sun's rays at particular areas of the collector portion such as along the entire length thereof, the position of the segments 26 may be adjusted. This may be accomplished by moving the ends 27 of the segments adjacent the open face 22 outwardly as shown in FIG. 3 of the drawings. This outward movement will cause the sun's rays to focus on points closer to the upper end of the collector portion 13. In this way, hot spots where the rays are very concentrated can be avoided, thus prolonging the useful life of the collector. Also, the adjustability of the segments 26 can compensate for slight differences in dimensions between individual furnaces resulting from manufacturing tolerances.

The rays of the sun heat the collector portion 13 which in turn heats the fluid circulating through the chamber of the collector portion 13 by means of conduits 43 and 44. The fluid may be transferred directly to a heat dissipating device such as radiator 20 by pump 17. Alternatively, if no heat is required by radiator 20, the heated fluid, that is, the gas or liquid may be pumped to a heat storage chamber 18 which may include the heat absorbing material such as rocks 19.

The above description and the accompanying drawings show that the present invention provides a novel solar furnace apparatus which is simple in design and relatively inexpensive. The solar furnace apparatus of the invention provides for the generation of heat efficiently. Also, the equipment can be of a minimum size with a significant savings in capital investment and operating costs because of the high efficiency of the apparatus of the invention. The solar furnace apparatus of the invention can be fabricated from commercially available components and materials utilizing conventional metal working techniques.

The solar furnace apparatus of the invention can be used as an individual unit or several combined into unitary structures. The apparatus of the invention thus provides a convenient means for generating small quantities of heat such as for a single dwelling or larger amounts such as for a business, an apartment or groups of dwellings.

It will be apparent that various modifications can be made in the particular solar furnace apparatus described in detail and shown in the drawings within the scope of the invention. For example, the size, configuration and arrangement of the components may be changed provided they do not adversely affect the operation of the apparatus. Therefore, the scope of the invention is to be limited only by the following claims.

What is claimed is:

1. A solar furnace apparatus including a reflector portion, a collector portion and a fluid transfer portion; said reflector portion including a generally dish-shaped reflective member, said reflective member having a conic section configuration with a large open face and a highly reflective internal surface, said reflective member including a fixed base section concentric with the axis of said reflective member, a plurality of movable curved segments extending from said fixed base section to the free edge of said open face of said reflective member, the end of each segment adjacent to said fixed base section being pivotally connected thereto; said collector portion being disposed along the axis and the focal point of said reflective member, said collector portion including a chamber formed of a plurality of concave longitudinal conductive metal sections joined at their edges, the cross section of said longitudinal sections forming a generally star-shaped configuration, said concave longitudinal sections being disposed substantially parallel to the longitudinal axis of said reflective member, end sections affixed to the free edges of said concave longitudinal sections and therewith forming an enclosed chamber, a central conduit means extending from one of said end sections to a point adjacent the other end section but spaced therefrom, a plurality of discrete longitudinal baffle means disposed within said chamber around said central conduit means, inlet and outlet means communicating with said chamber, mounting means for the securing of said collector portion adjacent the apex of said reflective member; said fluid transfer portion including conduit means connected to said inlet and outlet means of said collector portion and means associated with said conduit means for circulating fluid to heat storage or heat dissipating means.

2. A solar furnace apparatus according to claim 1 wherein said pivotal connection of said movable segments with said fixed base section is located significantly closer to the axis of said reflective member than to the open face thereof.

3. A solar furnace apparatus according to claim 2 wherein said pivotal connection is spaced from said axis less than about one-fourth the distance between said axis and said open face.

4. A solar furnace apparatus according to claim 1 wherein adjoining movable segments overlap along at least a portion of their lengths.

5. A solar furnace apparatus according to claim 4 wherein said adjoining segments overlap along substantially their entire lengths.

6. A solar furnace apparatus according to claim 1 wherein said movable segments are interleaved around the surface of said reflective member.

7. A solar furnace apparatus according to claim 1 wherein the distance across the points of said star-shaped cross section of said collector portion is between about one and one-half and three times the smallest cross-sectional dimension of said collector portion.

8. A solar furnace apparatus according to claim 1 wherein said discrete longitudinal baffle means include a plurality of spaced tubular sections.

9. A solar furnace apparatus according to claim 1 wherein said discrete longitudinal baffle means are divided longitudinally into a number of separate sections.

* * * * *